(No Model.)
R. E. POINDEXTER.
CROSSCUT SAW.
No. 553,071. Patented Jan. 14, 1896.
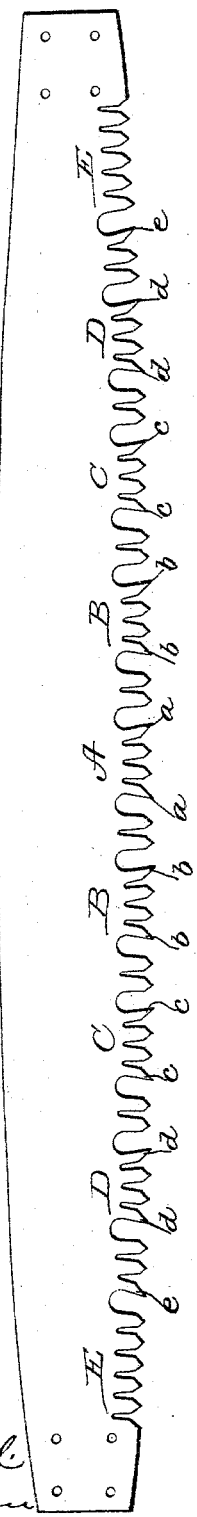
Witnesses
F. L. Ourand
L. A. Hartman
Inventor
Robert E. Poindexter,
per
E. W. Bradford
Attorney

UNITED STATES PATENT OFFICE.

ROBERT E. POINDEXTER, OF INDIANAPOLIS, INDIANA.

CROSSCUT-SAW.

SPECIFICATION forming part of Letters Patent No. 553,071, dated January 14, 1896.

Application filed September 19, 1895. Serial No. 562,982. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Crosscut-Saws; and I do hereby declare the following to be a full, clear, and exact description of the invention, such as will enable others skilled in the art to which it appertains to make and use the same.

My said invention consists in an improved construction of crosscut-saws, and it relates particularly to the form and arrangement of the teeth, whereby a greater number of cutting-teeth may be put in the same length of saw and its cutting capacity thereby increased without in any manner impairing its clearing or other necessary qualities, as will be hereinafter more fully described and claimed.

Referring to the accompanying drawings, which are made a part hereof and on which similar letters of reference designate similar parts, Figure 1 is a plan view of a saw of the character named constructed in accordance with my improved plan, with teeth of my improved form and arrangement; and Fig. 2 is a modified form or arrangement embodying the same invention.

The leading feature of this saw consists in the arrangement of the teeth in groups separated by deep gullets to receive the chips in the passage through the log or timber, alternate groups throughout the main portion of the saw, having drag or clearing teeth at each end of the group, each forming one side of a gullet. In the drawings I have designated these groups by letters as follows: A represents the central group or central section of the saw; B, the next group having clearing-teeth on each side of the center; C, the next two groups having clearing-teeth; D, the next two groups having clearing-teeth, and E the end groups consisting entirely of cutting-teeth. The several groups or sections A, B, C, and D each consist of two cutting-teeth of ordinary form and a clearing or drag tooth *a*, *b*, *c*, and *d*, respectively, on each side of said two cutting-teeth. Each of said clearing-teeth is inclined to extend its point away from the cutting-teeth of its group and is beveled to its point on its side next to said cutting-teeth, being thus formed to operate in one direction only. The gullet next to each clearing-tooth is of sufficient depth and width for the purpose, each clearing-tooth forming one side of a gullet. The cutting-teeth between said clearing-teeth in each group are also preferably inclined, each in the direction of the adjacent clearing-tooth or the two "flared" apart. By this arrangement the teeth are inclined to catch or dig into the wood more readily as the saw is dragged back and forth, creating what has been termed a "suction," which helps materially in the operation of the saw.

Between the groups A B, B C and C D two cutting-teeth of ordinary form are interposed, a gullet being formed on each side of said two teeth. Thus, as will be seen, two cutting-teeth are interposed between each two clearing-teeth, and said clearing-teeth are all "single" or formed with only one operative side or point. The gullets are all wide and have mouths out of which the chips will be readily discharged. The end sections, E, are composed entirely of cutting-teeth, no clearing-teeth being required at these points of the saw; but between each section E and the adjacent section D three teeth are interposed, the one next the section E being a clearing-tooth *e*, inclined toward the end of the saw and forming one side of the gullet at the end on said section E. Thus the clearing-teeth are arranged throughout the saw at the points where they are required and their points brought into such close relation to the cutting-teeth that all the space is economized and more cutting-teeth thus provided in the saw and its cutting capacity thus increased.

In Fig. 2 the arrangement shown is substantially the same, except that three cutting-teeth are shown interposed between the several groups containing the clearing-teeth, the groups C' are shown with but one clearing-tooth and three cutting-teeth, and the inclination of the cutting-teeth from the center of the saw toward each end thereof is more pronounced, or the greater number of teeth on each side of the center are inclined toward the end or in the direction of their natural operation in order to produce the suction before referred to. The "grouping" of the teeth in sections, with the cutting-teeth and clearing-teeth and gullets in the relative positions described, is, however, substantially the same. Adjacent cutting-teeth are, of course, "dressed" in opposite directions, as is usual.

Having thus fully described my said invention, what I claim as new, and desire to secure by Letters Patent, is—

1. A cross-cut saw the teeth whereof are arranged in groups, or sections, separated by gullets, alternate sections being composed of cutting teeth and cutting teeth with clearing teeth on each side of them, said clearing teeth being inclined from the saw plate into the gullets, and the adjacent cutting teeth of the same sections being inclined bodily in the same direction, substantially as set forth.

2. A cross-cut saw the teeth whereof are arranged in sections separated by gullets, said sections being composed of cutting teeth and both cutting and clearing teeth, alternately, the cutting teeth of the sections with the clearing being inclined bodily, substantially as set forth.

3. A cross-cut saw the teeth whereof are arranged in sections separated by gullets, a part of the sections being composed of inclined clearing teeth on the ends and a pair or more of primary cutting teeth, likewise inclined bodily, between them, substantially as set forth.

4. A crosscut saw provided with both cutting and clearing teeth, part of which on one side of the center of the saw are formed inclined in one direction and others of which on the same side are inclined in the other direction, and the part of the saw on the other side of its center being provided with similar teeth of similar form and arrangement, substantially as set forth.

In testimony whereof I affix my signature in presence of two witnesses.

ROBERT E. POINDEXTER.

Witnesses:
JAMES E. FRANKLIN,
JOHN C. LATSBAUGH.